United States Patent Office 3,150,936
Patented Sept. 29, 1964

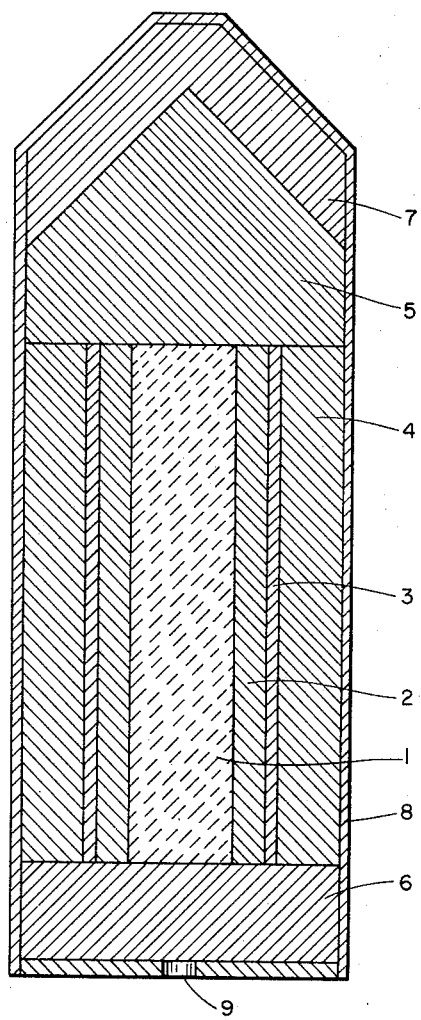
INVENTOR.
JAMES HUNT

3,150,936
TUNGSTEN TUBING EXTRUSION BILLET
James G. Hunt, Framingham, Mass., assignor to the United States of America as represented by the United States Atomic Energy Commission
Filed Aug. 20, 1963, Ser. No. 303,458
4 Claims. (Cl. 29—187.5)

This invention is related to extrudable billets and a process for the extrusion of seamless metal tubing. More particularly, it is related to extrudable billets and a process for the extrusion of long lengths of seamless narrow bore tungsten tubing.

Tungsten metal has outstanding properties of high melting point, high temperature strength and corrosion resistance. It is thus ideally suited for use in chemical processing equipment, heat exchangers, nuclear reactors, etc. where high temperatures are to be encountered. However, its use in the chemical and nuclear fields has been sharply curtailed due to the fact that it is very costly and difficult to fabricate into long lengths of tubing having a narrow bore.

Tungsten tubing with diameters smaller than .700 inch have been produced by the extension of conventional extrusion technology. In the simplest case, the following is involved: A hollow cylinder or sleeve of tungsten is inserted into a tight fitting, round, blind hole which has been machined concentrically in a cylinder or can of a metal such as molybdenum or steel. The hole is made so that its depth is greater than the length of the sleeve. The hole within the tungsten sleeve is filled with a cylinder, or core, of metal such as molybdenum or steel. The remaining cylindrical space within the hole is filled with another metal cylinder, or plug, of metal such as molybdenum or steel. A weld is then made which joins the plug to the can.

The billets thus prepared are lubricated and heated to temperatures of 1000 to 2000° C. The heated billets are then forced through an extrusion die to produce an elongated solid bar or rod. The metal can and metallic core are then removed from the bar to produce the tungsten tubing.

When it is desirable to produce tungsten tubing having a narrow bore (inside diameters of less than .750 in.) many difficulties are encountered. These involve the removal of the core. The conventional methods utilized for removal of the core in such processes are either boring out the core and/or etching away the core. Both methods are costly as well as time consuming. When boring is employed, lengths of tubing greater than 2 feet are most difficult and costly to obtain because of mechanical limitations of boring tools. Furthermore, the tubing must be extremely straight in alignment or the boring tool will damage the tubing walls. Such straightness is almost unattainable in greater than 2 foot lengths. Etching away the solid metal core material is also difficult and time consuming because of the small surface area presented by the relatively large amount of core material to be removed by the etching solution.

It is an object of this invention to provide extrudable billets and a process for extrusion of seamless metal tubing.

It is another object of this invention to provide extrudable billets and a relatively low temperature, efficient, economical process of producing long lengths of worked, seamless tungsten tubing.

Other objects of this invention will, in part, be obvious and will, in part, appear hereinafter.

I have discovered that the above and other objects can readily be accomplished by the substitution of a frangible core material for a portion of the metal core material previously used by those skilled in the art. The use of a frangible core eliminates the necessity of conventional boring or etching to remove the central core material from the extruded rods. It permits central core removal to be effectuated by rapidly cutting it away by reaming with an agitated or whirling blade or probe which will not damage the tungsten tubing contained in the extruded rod. Furthermore, the billets of my invention are extrudable at much lower temperatures ranging down to about 1000° C. which lower temperatures when employed produce a much more worked tungsten metal than that achieved by prior art billets and processes.

The frangible cores of my invention are made up of high melting point materials such as graphite, ceramics, glasses, silicates etc. Such materials are easily removed from extruded rods by simple reaming techniques. The required properties and choice of such frangible materials will be well understood by those skilled in the art. In the preferred embodiment of my invention, I use graphite rods as a billet core. The use of a frangible core such as a graphite rod was previously not possible by those skilled in the art because it was thought to be too soft and brittle to perform the functions required of a core in such processes. However, I have discovered that graphite is plastic under the conditions of my invention and the benefits gained by its use are obvious. When graphite is employed as the core, it is best to carry out the extrusion of the billets at temperatures ranging between about 1000° C. and about 1800° C. Of course if other materials are used for the frangible core, extrusion temperatures will have to be employed at which the core has sufficient plasticity to permit uniform extrusions. Such temperatures may easily be ascertained by experimentation.

In order that the novel billets and process of my invention can be more fully understood, reference is made to the figure which shows a typical billet structure in which my novel invention can be employed.

A cylindrical solid frangible core 1 is encased in a first annular molybdenum sleeve 2. A second annular tungsten sleeve 3 encases the first annular sleeve. A third annular molybdenum sleeve 4 encases the second annular tungsten sleeve 3. A molybdenum nose plug 5 having both a conical portion and a cylindrical portion extends from the cylindrically shaped body formed by the core 1 and the annular sleeves surrounding the core 1. A cylindrical molybdenum tail plug 6 extends from the end of the cylindrically shaped body opposite the nose portion of the billet. A steel nose cap 7 extends from the conical portion of the nose plug 5. An external jacket 8 surround the nose plug 5 and sleeve portions of the billet. An orifice 9 is provided in the steel jacket 8 to permit evacuation of air and gases from the billet.

The function of the graphite core in the novel billets and process of my invention is to provide a material which can be extruded in a manner which is sufficiently uniform so that an undisturbed flow of tungsten is obtained and whereby a central core rod is formed within the extruded rod which can be readily removed with simple tools. Metallic cores are not practical in such billets because of the difficulties heretofore noted and due to the fact that they would bond metallurgically with the remaining billet materials due to the relatively high pressures and temperatures employed when tungsten is extruded.

The first annular sleeve 2 of the billets of my invention preferentially are composed of molybdenum. However, steel can be utilized in place of the molybdenum provided that the third annular sleeve 4 is also composed of steel. The function of the first annular molybdenum sleeve 2 is to act as a mechanical buffer between the uniformly extruding tungsten and the relatively non-uniform extruding graphite.

The second annular tungsten sleeve 3 can be in the form of pressed or loose powder, wrapped sheet, a wrought cast or sintered sleeve.

The third annular sleeve of the billets of my invention preferentially are composed of molybdenum. However, steel can be utilized in place of the molybdenum and must be utilized when the first annular sleeve 2 is also composed of steel. The function of the third annular sleeve is to provide a co-extrudable substance of lower stiffness than tungsten, which allows extrusion to take place at higher reductions and lower temperatures. To achieve a thin-walled tungsten tube without the third annular sleeve 4, higher temperatures ranging above 1800° C. would be required. The third annular sleeve 4 also absorbs a large fraction of the shearing forces inherent in the extrusion and causes a deformation of the tungsten to occur under more nearly isostatic compression. This is desirable because of the relative brittleness of tungsten.

The purpose of the nose plug 5 and tail plug 6 is to reduce the amount of tapered section in the tube which otherwise would occur because of the greater stiffness difference between the steel nose cap and the second annular tungsten sleeve 3. The steel nose cap 7 being softer than the sleeve and nose plug 5 materials causes lower upset or breakthrough pressures and thus permits higher reductions at the same temperatures.

The steel jacket 8 enveloping or encapsulating the billet enables the internal components of the billet to be kept free from contaminants such as air by permitting evacuation of such contaminants out of the billet through orifice 9 in the jacket. Air is undesirable in the billets due to the fact that it may react adversely on the billet materials under the conditions employed in the extrusion and also because it is liable to cause bulging of the components during or prior to extrusion of the billets.

The exact dimensions for the billet components can vary widely according to the dimensions of the desired final product. The size of the frangible core is chosen to allow its speedy removal by reaming, but still not interfere with the extrusion of the tungsten tubing. Smaller diameter extruded frangible cores require greater reaming times.

The steps of billet preparation, billet design, billet tooling, billet lubrication and billet extrusion are well known to those skilled in the art and choice of actual billet fabrication methods and design will be greatly dependent on the materials and equipment employed in the extrusion process. The billet dimensions can vary widely and the use of nose and tail plugs, the nose cap, steel jacket and third annular sleeves which are employed in the preferred embodiment of my invention can be dispensed with entirely. However, the quality of the tubing and amount of usable tubing produced will greatly decrease when such components are deleted.

The following example is given merely to illustrate my invention and is not to be construed as limiting the scope of my invention:

*Example I*

An extrudable billet having a shape and design generally in accordance with the shape and design of that shown in the figure was prepared. The frangible core consisted of a cylindrical rod of conventional commercially extruded graphite 0.8″ in diameter and 4″ in length. The first annular sleeve 2 was composed of sintered molybdenum having a 0.8 inch inside diameter and a 1.3 inch outside diameter with a 4 inch length. The second annular sleeve 3 was composed of sintered tungsten having a 1.3 inch inside diameter and a 1.5 inch outside diameter with a 4.0 inch length. The third annular sleeve 4 was composed of sintered molybdenum having a 1.5 inch inside diameter and a 2.5 inch outside diameter with a 4.0 inch length.

The nose plug 5 was composed of sintered molybdenum having both a cylindrical portion and a conical portion. The cylindrical portion of the nose plug 5 had an outside diameter of 2.5 inches and a length of 0.75 inch. The conical portion of the nose plug had a 90° included angle. The tail plug 6 was composed of sintered molybdenum having a 2.5 inch outside diameter with a 0.75 inch length. The nose cap 7 was composed of carbon steel having a 2.5 inch outside diameter whose length was 0.75 inch and whose front and rear surfaces were parallel to the conical surface of the nose plug 5. In addition, the front surface of the nose cap 7 had a flat surface 0.5 inch in diameter.

The nose cap 7, nose plug 5, tail plug 6, and third annular sleeve 4 were encapsulated in a close fitting steel jacket 8 having a thickness of approximately 0.075 inch. An orifice 9 was provided at the rear of the jacketed billet. A steel pipe was welded to the orifice 9.

The billet was heated to 900° C. for four hours under continuous evacuation and a tube welded in orifice 9 was crimped over and pounded flat to seal off the billet after this initial heating. The billet was then cooled and scales on the jacket from the heating were removed by a vapor blast. The billet was then covered with a 25 mil coating of lubricant by pouring a slurry —200 mesh glass powder suspended in cellulose nitrate diluted with lacquer thinner over the billet. The lubricated billet was then heated in a Globar furnace within an argon purged tubular steel muffle for about four hours including a one-hour soak at 1200° C.

The heated billet was then extruded through a mica lubricated molybdenum alloy die having an 0.7 inch inside diameter and a 1.5 inch length, in a hydraulic extrusion press having a 600 ton capacity and a maximum ram speed of 2.2 inches/sec. During the extrusion of the billet a ram speed of 2.2 inches/sec. was maintained by applying a force ranging from 400 to 600 tons (60 to 100 tons per sq. inch) to the billet. The extrusion reductions obtained were approximately 18.6 times in cross sectional area.

The extruded rods while hot, immediately after the extrusion, were rolled on the floor to give them a degree of straightness. A central portion of the rod approximately 65 inches in length, was removed from the rod to eliminate the nose and tail portions of the rod which contained no tungsten tubing. The cropped rod was then reamed to remove the graphite core by rotating it in a lathe and forcing a small steel tube having a spoon-shaped projection against the graphite core of the extruded rod to ream out the core from the cropped extruded rod. A compressed air blast was maintained on the core during reaming to remove loose particles of graphite which accumulated within the rod. After the graphite core was removed from the rod, it was placed in an acid tank. A solution of nitric and sulfuric acid was passed through the reamed hole for two hours to remove the first annular molybdenum sleeve 2 from the rod. Meanwhile a solution of nitric and sulfuric acid was removing the third annular molybdenum sleeve 4.

A finished worked, seamless tungsten tube having a uniform inside diameter of 0.315 inch and outside diameter of 0.375 inch with at least 50 inch length was obtained. Thus, it is obvious that my invention provides an efficient, economical billet which may be extruded at relatively low temperatures to produce worked seamless narrow bore tungsten tubing.

Having described my invention, what I claim as new and desire to secure by Letters Patent is:

1. An extrusion billet comprising:
   (*a*) a frangible solid core;
   (*b*) a first annular sleeve composed of a metal selected from the group consisting of molybdenum and steel surrounding the core;
   (*c*) a second annular tungsten sleeve surrounding the first annular sleeve.

2. A billet in accordance with claim 1 wherein said core is formed of graphite.

3. A billet in accordance with claim 2 wherein said first annular sleeve is molybdenum.

4. An extrusion billet for the production of seamless tungsten tubing comprising:
   (a) a cylindrically shaped solid graphite core;
   (b) a first annular molydenum sleeve covering the longitudinal surface of the graphite core;
   (c) a second annular tungsten sleeve covering the outer longitudinal surface of said first annular molybdenum sleeve;
   (d) a third annular molybdenum sleeve covering the outer longitudinal surface of the second annular sleeve;
   (e) a molybdenum nose plug having cylindrically-shaped part extending from the body formed by the graphite core and sleeves surrounding the core and a cone-shaped part extending from said cylindrically-shaped part;
   (f) a cylindrically shaped molybdenum tail plug extending from the body formed by the graphite core and the sleeves surrounding the core;
   (g) a steel nose cap extending from the cone-shaped part of the nose plug;
   (h) a steel jacket surrounding cap, plug and sleeve portions of the billet.

References Cited in the file of this patent
UNITED STATES PATENTS

| | | |
|---|---|---|
| 377,317 | Marshall | Jan. 31, 1888 |
| 440,694 | Burdon | Nov. 18, 1890 |
| 2,966,738 | Bertossa | Jan. 3, 1961 |
| 3,122,423 | Hessler | Feb. 25, 1964 |